Oct. 6, 1959     W. H. TAYLOR     2,907,569
MODEL AIRCRAFT CONTROL DEVICE
Filed Nov. 29, 1957     3 Sheets-Sheet 1

INVENTOR.
WILLIAM H. TAYLOR
BY *Lothrop & West*
ATTORNEYS

INVENTOR.
WILLIAM H. TAYLOR
BY Lothrop & West
ATTORNEYS

INVENTOR.
WILLIAM H. TAYLOR
BY Lothrop & West
ATTORNEYS

United States Patent Office 2,907,569
Patented Oct. 6, 1959

2,907,569

MODEL AIRCRAFT CONTROL DEVICE

William H. Taylor, Sacramento, Calif.

Application November 29, 1957, Serial No. 699,806

8 Claims. (Cl. 272—31)

The invention relates to devices for remotely controlling tethered model aircraft, and, more particularly, to devices for mechanically varying the operation of a model aircraft's engine from a location outside the flight circle of the aircraft.

In my co-pending application, Serial No. 675,448 filed July 31, 1957, entitled Control for Model Aircraft I have shown and described a device enabling the operator of a tethered model aircraft to maneuver the craft with nice precision insofar as takeoffs, changes of elevation and landings are concerned. The foregoing invention, however, presupposes that the craft's engine speed once take-off is effected, remains substantially constant; it does not, in other words, provide mechanism which will permit the operator to vary the engine speed from his remote control position.

Model aircraft engines presently on the market enable an operator to control the engine's operation by suitable manipulation of a valve forming a part of the engine itself. While the valve may, in some instances, be of the throttle or fuel feed type, it may in other instances, be of the back pressure variety in which the engine speed is controlled by changing the extent of the exhaust opening. In either event, by displacing the valve a predetermined amount from a normally fully closed position (or from a normally wide open position, depending on the particular scheme adopted by the engine manufacturer) the engine speed can be regulated, the speed depending upon the extent of valve displacement. Displacement of the valve from a remote location, as by use of a cable fastened to the valve, would enable an operator to increase or decrease engine speed at will from such location.

It is therefore an object of the invention to provide a device which enables an operator to control the operation of a model aircraft engine from a remote location.

It is another object of the invention to provide a device which not only permits an operator to maneuver a model aircraft with respect to its take-offs, changes of elevation and landings, but which also enables the operator to control the craft's engine speed.

It is yet another object of the invention to provide a readily portable aircraft controlling device, and one which can easily be erected and disassembled.

It is a further object of the invention to provide a device which is characterized in its operation by a minimum of frictional losses.

It is another object of the invention to provide a generally improved model aircraft engine device.

Other objects, together with the foregoing, are attained in the embodiment described in the following description and shown in the accompanying drawings in which.

Figure 1:
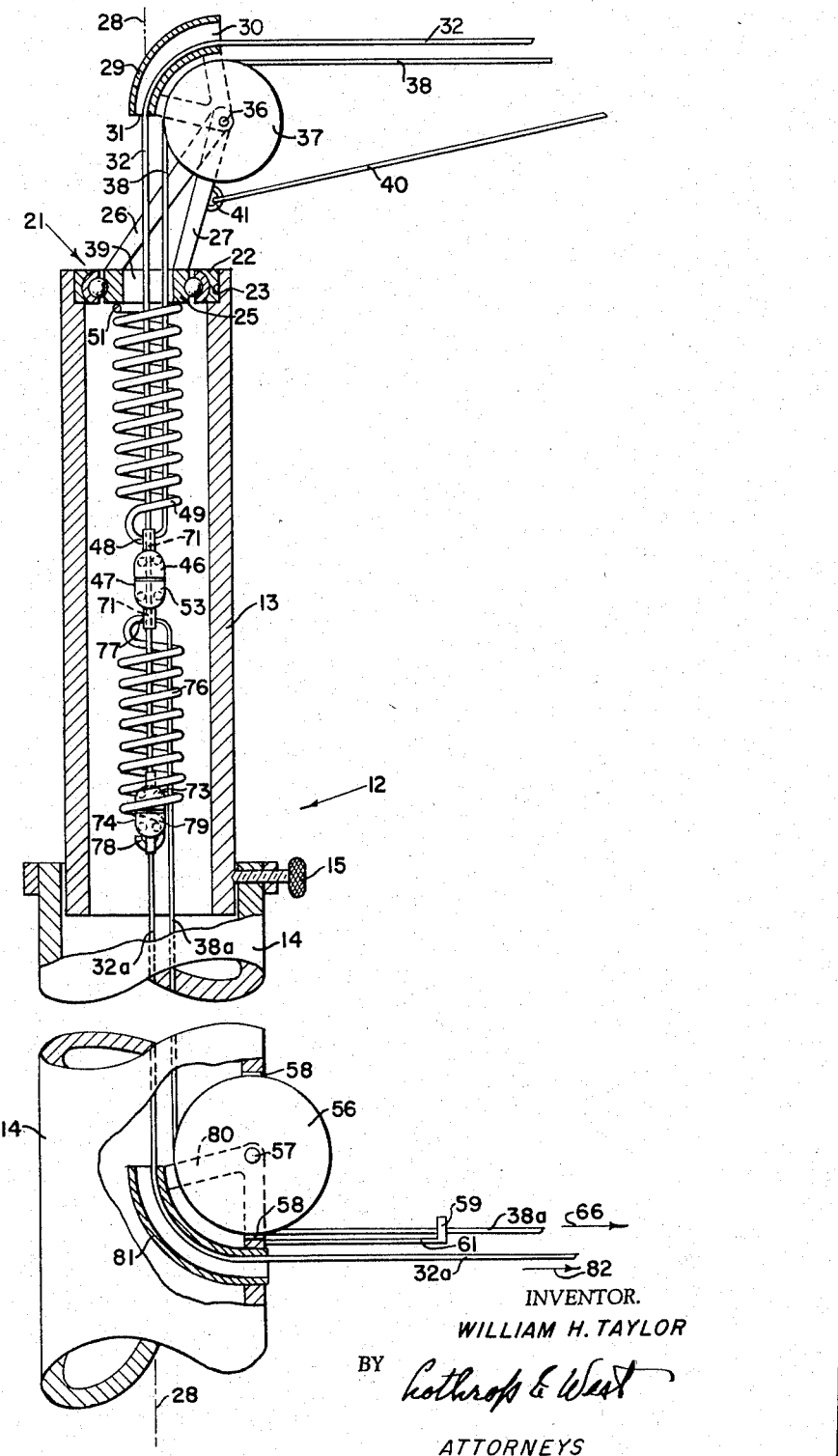
Figure 1 is a fragmentary view of a preferred form of pylon, and attendant structure, a portion being shown in elevation and a portion in median vertical section.

While the device is readily adaptable to different embodiments, the herein shown and described embodiments have been exhaustively tested and have performed in a very successful manner.

For convenience in stowing and carrying, the hollow vertical pylon 12, preferably includes an upper section 13 and a lower section 14 disposed in telescoping fashion, the sections being lockable at any predetermined length as by a set screw 15. As appears most clearly in Figure 4, and as is shown and described in some detail in my above-identified co-pending application, the lower end of the pylon is detachably fastened to a plate 16 which is firmly supported, ordinarily on the ground, and is at the center of the flight circle.

Whereas the pylon is stationary, the model aircraft flies around the pylon in a circular path. In order that the various cables leading to the aircraft from the pylon be maintained in substantially radial orientation an anti-friction bearing 21 is mounted on the upper end of the pylon, with the outer bearing race 22 preferably secured in a counter-bore 23 in the pylon so that the bearing top is flush with the top of the pylon.

An appropriate set of bracket members 26 and 27 are mounted on the inner race 25 of the bearing and are freely rotatable therewith. Likewise freely rotatable about the pylon's vertical axis 28 is a cable guide 29 or cable conduit, secured to the upper ends of the brackets 26 and 27. The cable guide 29 is conveniently formed from a tubing bent in a quarter circle and somewhat flared adjacent its upper and outer end, as at 30.

The guide 29 is disposed so that its inner or lower end 31 is substantially co-axial with the pylon axis 28. Consequently, the engine control cable 32, which is disposed for a portion of its length on the vertical axis 28 of the pylon, is supported and guided around a quarter-turn by the conduit 29, as appears most clearly in Figure 1.

Upon emerging from the conduit's flared end 30, the engine control cable 32 is directed in a substantially horizontal attitude, the outer end of the cable 32 being secured to the model aircraft (not shown), and, more particularly to the aircraft's engine control valve (not shown). The exact manner of fastening forms no part of the present invention and is therefore not described in detail. The flared portion 30 of the conduit enables the control cable 32 constantly to "point toward" the aircraft even though the plane moves upwardly and downwardly through a considerable range of elevations.

Rotatably mounted on a horizontal pin 36 secured to the junction of the brackets 26 and 27 is a pulley 37, the pulley 37 being grooved to receive the aircraft maneuvering cable 38 which, like the engine control cable 32, passes through the central opening 39 in the anti-friction bearing 21.

Appropriately fastened to the bracket 27 and leading to the aircraft is a tether cable 40, the tether cable resisting substantially all of the centrifugal force exerted by the model aircraft as it pursues its circular course.

Preferably, the tether cable 40, the maneuvering cable 38 and the engine control cable 32 are substantially disposed within a vertical plane extending through the pylon and the aircraft so that the cables all lie in the same vertical plane. In other words, the plane of the pulley 37 is substantially co-planar with the curved guide 29 and the mounting 41 of the tether cable. The foregoing construction enables all of the cable wires to swing around in unison as the aircraft revolves about its vertical flight axis, the cables all pointing directly at the aircraft.

Whereas the length of the tether cable 40 remains substantially fixed, the effective length (the distance between the pylon and the aircraft) both of the maneuvering cable 38 and of the engine control cable 32 are caused to vary, the variance in the effective length of the cables causing the aircraft to execute its various maneuvers and to change speed at the will of the operator.

The maneuvering cable 38 is fastened, adjacent its lower end, to the upper end 46 of an upper swivel 47, the swivel preferably being of the anti-friction type. Likewise secured to the upper end of the upper swivel 47 is the lower end 48 of a helical spring 49, the upper end 51 of the spring being affixed to the inner race 25 of the bearing 21 and rotatable therewith. It can be seen most clearly by reference to Figure 1 that as the aircraft revolves about the pylon the vertical portion of the maneuvering cable 38, enclosed within the cage of the spring 49, freely swings around in co-axial relation with the central pylon axis 28, the swivel 47 isolating the circular motion of the upper end 46 of the swivel 47 from the lower end 53 of the swivel.

However, the swivel's upper end 46 is not isolated from the lower end 53 insofar as translational or axial motion is involved. Consequently, vertical movement of the lower maneuvering cable 38a mounted on the lower end 53 of the swivel 47 effects a corresponding vertical translation of the upper cable portion 38.

The lower maneuvering cable portion 38a is led downwardly from the swivel 47 and outwardly from the pylon over a lower pulley 56 rotatably mounted on a pin 57 extending transversely in a vertically elongated slot 58 in the wall of the pylon. Preferably, an eye 59 extending outwardly from the pylon on an arm 61 encircles the cable 38a and serves to guide the cable toward its mounting on a control bar mechanism, generally designated by the numeral 62 and shown most clearly in Figures 2 and 3.

By reference to Figure 1 it is apparent that as the lower cable portion 38a is urged toward the right, in the direction indicated by the arrow 66, the upper swivel 47 and the vertical upper cable portion 38 are translated downwardly. In turn, the effective length of the cable 38 between the pylon and the aircraft is shortened, causing an appropriate change in aircraft elevation. It is to be noted that downward translation of the upper swivel 47 stretches the upper spring 49 so that when the tension on the lower cable 38a is later reduced, the upper cable portion 38 is urged upwardly, permitting the centrifugal force of the aircraft to take up the slack in the upper cable 38 and to return the aircraft to level flight condition.

Upward and downward movement of the vertical upper portion of the engine control cable 32, resulting in corresponding engine speed changes, is effected by a somewhat comparable arrangement, but differing in some important respects.

Axially bored in the upper swivel 47 is a channel 71, the channel extending entirely through the length of the swivel and being large enough to accommodate the engine control cable 32. The cable 32, in other words, passes freely through the swivel and is secured to the upper end 73 of a lower anti-friction swivel 74.

A lower helical spring 76 is secured at its upper end 77 to the lower end 53 of the upper swivel 47. The lower end 78 of the spring 76 is fastened to the lower end 79 of the lower swivel 74. Likewise affixed to the lower end 79 of the lower swivel 74 is the upper end of the lower portion of the engine control cable 32a, the cable passing downwardly and outwardly through a lower cable guide 81, or conduit, the cable being bent through a quarter-turn and directed toward the remote control structure 62. An arm 80 assists in holding the guide 81 substantially co-planar with the lower pulley 56.

As can be seen by reference to Figure 1, when the engine control cable 32a is moved in a right-hand direction, indicated by the arrow 82, the lower swivel 74 is pulled downwardly, the lower spring 76 is stretched and the vertical portion 32 of the engine control cable is accordingly translated downwardly, resulting in an appropriate speed change. When tension on the cable 32a is reduced, the lower spring 76 returns the elements to "normal" position. The lower spring 76 is made substantially "weaker" than the upper spring 49 so that when the lower swivel 74 is pulled downwardly by the cable 32a, the lower spring 76, not the upper spring 49, stretches.

It is especially to be emphasized, in other words, that the maneuvering cables 38 and 38a are independently operable with respect to the engine control cables 32 and 32a, owing to the fact that the maneuvering cables 38 and 38a are affixed to the upper swivel 47 (through which the engine control cable 32 is freely slidable) whereas the engine control cables 32 and 32a are affixed to the lower swivel 74. This enables the engine speed to be altered while the craft remains in level flight and vice versa.

It is to be noted further that while the swivels serve to transmit translational movement, the lower cable portions 32a and 38a are isolated from the freely rotatable upper cable portions 32 and 38, respectively. Binding or twisting of the cables is thereby obviated.

Changes in tension on the cables are effected by the control mechanism 62, the structure 62 being located remote from the pylon and outside the flight circle of the aircraft. The control structure 62 comprises a sharpened stake 83 provided with a plurality of wing plates 84 whose upper surfaces 85 can be stepped or hammered on to drive the stake into the ground 86, the plates 84 also serving as braces to help maintain the stake 83 in vertical attitude.

Pivotally mounted on a horizontal pin 87 in the stake is a control bar 88, or lever, provided adjacent its upper end with a hand grip 89, the bar being rockable toward and away from the pylon. A plurality of apertures 91 in the bar serves to anchor the maneuvering cable 38a in a number of different locations, some flexibility of operation being provided thereby. That is to say, one operator might prefer that the lever be swung through a considerable arc to effect a given change in aircraft elevation; another operator might like to swing the lever through a smaller arc to achieve the same result.

Figure 2:
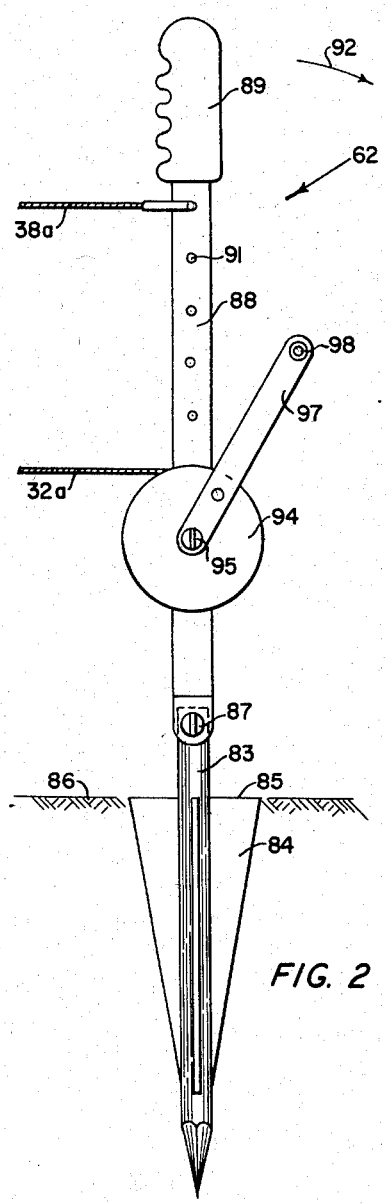
Figure 2 is a side elevation of the control bar structure located at the operator's control station.
Figure 3:
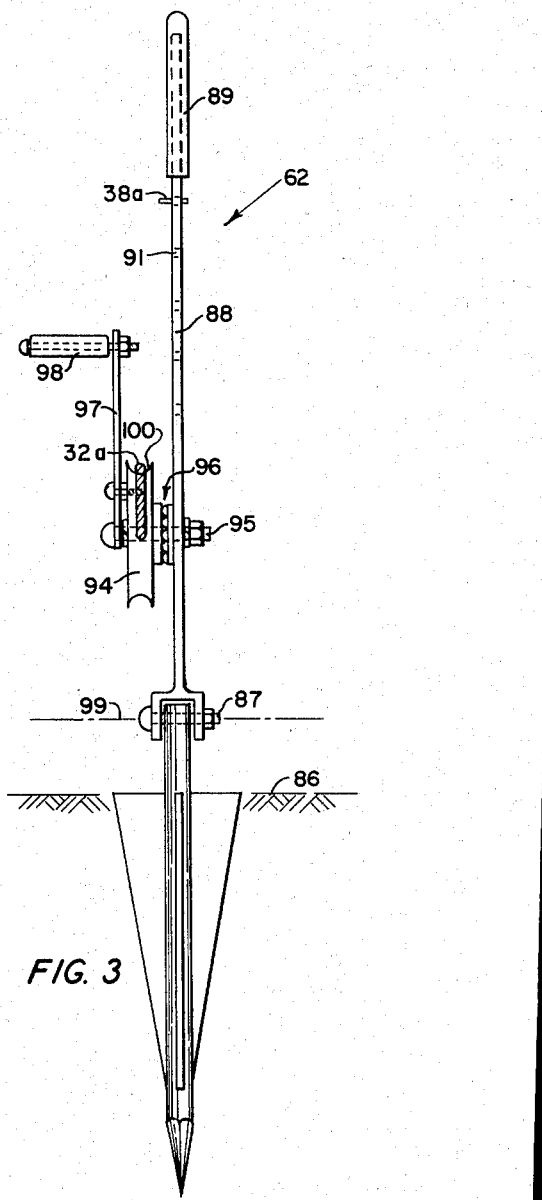
Figure 3 is a rear elevation of the control bar structure.

In either event, swinging the lever in a clockwise direction, shown by the arrow 92 in Figure 2, urges the maneuvering cable 38a in the right hand direction 66. This movement, in turn, through the structure previously described, changes the effective length of the cable 38 and alters the attitude of the aircraft. When the aircraft has attained the new desired elevation, the stick 88 is returned to "normal" or vertical attitude.

It will be noted that the change in attitude is effected without a change in engine speed, the speed remaining constant even though the engine control cable 32a is urged toward the right, as appears in Figure 2, concurrently with the clockwise movement of the control lever 88. The reason for this is that the cable 32a is reaved at least partially about a sheave 94 mounted on a transverse pin 95 secured to the bar 88. Interposed between the sheave 94 and the bar is a pair of cooperating friction plates 96, for example of dimple and depression construction, which permits the sheave to be rotated only by the exertion of considerable force, as by turning a crank 97 by a crank-handle 98. While the actual dimensions of the elements will vary with the size of the control mechanism, it has been found that good results are obtained where the distance between the axis 99 of the pin 87 and the point of tangency 100 between the cable 32a and the sheave periphery is made to equal the distance between said point of tangency 100 and the juncture of the cable 38a and the bar 88; and, further, that the diameter of the sheave be approximately one-half of said distance. With these dimensions, and with a sheave (or a sector thereof if desired) rather than a straight mounting such as that utilized by the cable 38a, both the cable 38a and the cable 32a are moved the same linear amount even though the end of the cable 38a swings through a greater arc (about the axis 99) than the end of the cable 32a. Consequently, no relative motion between the cables occurs and the engine speed remains constant even though the craft's elevation is changed.

When, on the other hand, it is desired to change the engine speed without any change in elevation, the lever 88 is maintained at a fixed attitude and the crank 97 is rotated in the appropriate direction and amount. Combinations of both motions are also possible and, in fact, concurrent manipulations of both lever and crank add much to the realistic operation of the model aircraft.

Figures 4, 5:
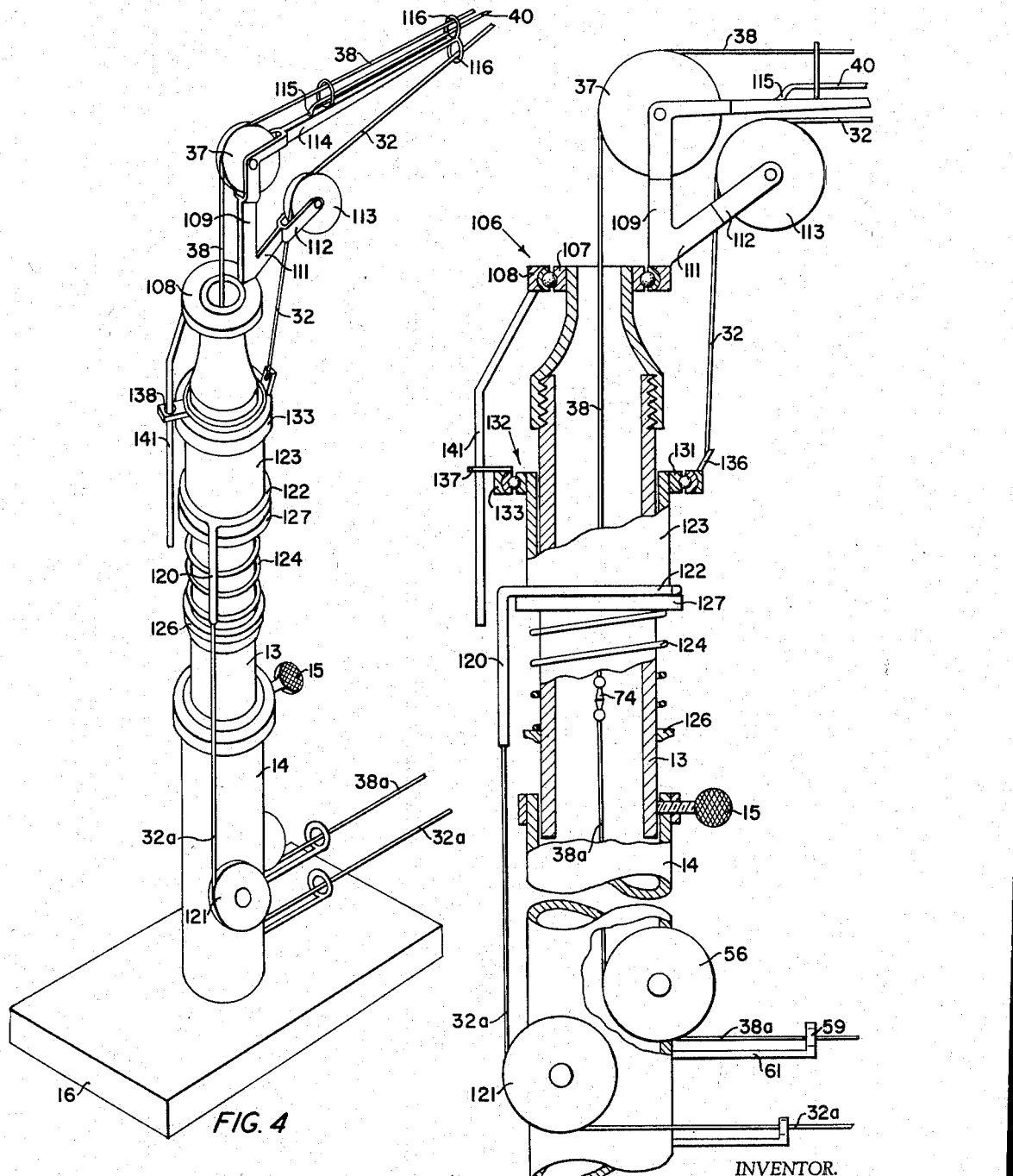
Figure 4 is a perspective of a modified form of a pylon structure.
Figure 5 is a fragmentary showing, partially in section and to an enlarged scale, of a portion of the Figure 4 form of pylon structure.

Figures 4 and 5 illustrate a modified form of the pylon structure and, where applicable, comparable reference numerals are utilized.

Mounted on the upper end of the upper pylon tubing 13 is an anti-friction bearing 106 including an inner race 107 secured to the tubing 13 and an outer race 108. The maneuvering cable pulley 37 is rotatably mounted on one arm 109 of a bracket 111 secured to the outer race 108, the other bracket arm 112 holding a pulley 113 about which is reaved the engine control cable 32. Projecting toward the aircraft from the bracket 111 is an arm 114 provided with a pair of cable guides 116, the upper one of the guides 116 embracing not only the maneuvering cable 38, but also the tether or fixed cable 40 secured to the arm 114 as at 115.

Translational movement of the maneuvering cable lower portion 38a is transmitted to the cable upper portion 38 through the anti-friction swivel 74, the swivel isolating the rotational movement of the upper cable portion 38 as it turns to follow the aircraft.

Horizontal movement of the engine control cable lower portion 32a, however, is handled in a somewhat different fashion. A pulley 121 rotatably mounted on the side of the pylon changes the direction of movement of the cable 32a from horizontal to vertical. At the upper end of the vertical run of the cable 32a, the cable is secured to a pin 120 affixed to a ring 122 encircling a sleeve 123, or collar, which in turn encircles the pylon. Urging the sleeve 123 upwardly is a spring 124 encompassing the pylon, the spring bearing at its lower end against a shoulder 126 mounted on the pylon and at its upper end against a flange 127 on the lower end of the sleeve 123.

Downward movement of the cable 32a results in a downward movement of the sleeve 123, this downward movement being resisted by the spring 124. The upper end of the sleeve 123 has mounted thereon the inner race 131 of an anti-friction bearing 132, the outer race 133 of which has two members secured thereto. One member is an attaching strip 136 to which the inner end of the cable 32 is affixed. The other member is an outstanding plate 137 having an aperture 138, the aperture having disposed therein a rod 141 depending from the outer race 108 of the bearing 106.

It can therefore be seen that the outer races 108 and 133 of the bearings 106 and 132, respectively, are free to rotate in response to the revolutions of the aircraft, the rod 141 transmitting the rotation of the upper outer race 108 to the lower outer race 133, of the bearing 132. Concurrently, vertical movements of the engine control cable lower portion 32a are transmitted to the cable upper portion 32 through the interposed pin 120, ring 122 and sleeve 123, or collar, structure.

It can therefore be seen that I have provided an accurate, highly responsive and flexible aircraft control device whose operation closely simulates the management of a full-scale aircraft.

What is claimed is:

1. In a control attachment for model aircraft including a hollow vertical pylon, a control lever removed from said pylon, an upper pulley rotatably mounted on the top of said pylon, a lower pulley rotatably mounted adjacent the bottom of said pylon, an aircraft elevation control cable secured to said lever and reaved over said pulleys and attached to a model aircraft, and a first swivel interposed in said elevation control cable within said pylon, the combination of: a hand-operated wheel rotatably mounted on said lever, an aircraft engine control cord secured to the periphery of said wheel and led interiorly of said pylon adjacent the bottom thereof, said cord emerging from the top of said pylon and being attached to a model aircraft, and a second swivel interposed in said engine control cord within said pylon.

2. The device of claim 1 wherein said control lever is pivotally mounted to pivot about a pin in a direction toward and away from said pylon, and wherein the distance between said pin and the peripheral point of contact between said cord and said wheel is substantially equal to the distance between said point of contact and the point of attachment of said cable to said lever.

3. The device of claim 2 wherein the diameter of said wheel is substantially equal to one-half the distance between said point of contact of said cord and said wheel and said pin.

4. A device for controlling the speed of a model aircraft engine comprising: a vertical hollow pylon, said pylon having disposed therein an upper swivel interposed in the vertically translatable portion of a model aircraft elevation control cord vertically traversing said pylon; an engine speed control cable vertically disposed in said pylon and emerging from the top and the bottom of said pylon, said cable being slidably disposed in a vertical passageway through said upper swivel; and a lower swivel interposed in the portion of said engine speed control cable within said pylon.

5. A model aircraft engine speed control device comprising in combination with an elevation control cable: a hollow vertical pylon encompassing a vertical run of said elevation control cable; an upper guide revolvably mounted on said pylon; a lower guide mounted on the lower end of said pylon; an engine speed control cable disposed in said guides and including an upper cable portion disposed in and revolvable with said upper guide and a lower cable portion disposed in said lower guide; means for isolating said lower engine speed control cable portion from the revolutions of said upper cable portion; means for transmitting vertical movements of said lower engine speed control cable portion to said upper engine speed control cable portion; and means for translating said engine speed control cable and said elevation control cable in unison and independently.

6. The device of claim 5 wherein said isolating means includes a swivel having its upper end attached to said upper engine speed control cable portion and its lower end attached to said lower engine speed control cable portion.

7. The device of claim 5 wherein said isolation means includes a collar encompassing said pylon and being vertically translatable thereon, an anti-friction bearing having its inner race mounted on said collar, means for connecting said upper guide and the outer race of said bearing for movement therewith, means for attaching said upper engine speed control cable portion to said outer bearing race, and means for attaching said lower engine speed control cable portion to said collar.

8. The device of claim 7 further characterized by a helical spring encompassing said pylon, said spring being disposed below and in supporting relation with the lower end of said collar.

References Cited in the file of this patent

UNITED STATES PATENTS

| | | |
|---|---|---|
| 2,478,351 | Wood | Aug. 9, 1949 |
| 2,603,910 | Jones | July 22, 1952 |
| 2,650,827 | Hamilton | Sept. 1, 1953 |